(12) United States Patent
Suhonen et al.

(10) Patent No.: US 7,734,647 B2
(45) Date of Patent: Jun. 8, 2010

(54) PERSONAL REMOTE FIREWALL

(75) Inventors: Harri Suhonen, Helsinki (FI); Jyrki Stenvall, Espoo (FI); Ari Lassila, Espoo (FI)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 10/931,262

(22) Filed: Aug. 30, 2004

(65) Prior Publication Data

US 2005/0060328 A1    Mar. 17, 2005

(30) Foreign Application Priority Data

Aug. 29, 2003    (WO) .................. PCT/IB03/03606

(51) Int. Cl.
*G06F 17/30*    (2006.01)
(52) U.S. Cl. .................. 707/781; 709/219; 709/225; 709/229
(58) Field of Classification Search .............. 707/10
See application file for complete search history.

(56) References Cited

U.S. PATENT DOCUMENTS

| | | | | |
|---|---|---|---|---|
| 6,158,008 | A * | 12/2000 | Maria et al. .................. 726/13 |
| 6,553,410 | B2 * | 4/2003 | Kikinis .............. 707/E17.121 |
| 7,346,803 | B2 * | 3/2008 | Ide et al. .................. 714/4 |
| 7,359,933 | B1 * | 4/2008 | Polen et al. .................. 709/203 |
| 7,406,653 | B2 * | 7/2008 | Ide et al. .................. 714/799 |
| 2001/0043595 | A1 * | 11/2001 | Aravamudan et al. ...... 370/356 |
| 2002/0169980 | A1 * | 11/2002 | Brownell .................. 713/201 |
| 2003/0087629 | A1 * | 5/2003 | Juitt et al. .................. 455/411 |
| 2003/0140193 | A1 * | 7/2003 | Acharya et al. ............ 711/112 |
| 2003/0204601 | A1 * | 10/2003 | Takano .................. 709/227 |
| 2004/0215979 | A1 * | 10/2004 | Brownell .................. 713/201 |
| 2004/0225895 | A1 * | 11/2004 | Mukherjee et al. ......... 713/201 |
| 2005/0193281 | A1 * | 9/2005 | Ide et al. .................. 714/47 |

FOREIGN PATENT DOCUMENTS

EP    1 328 102    7/2003

(Continued)

OTHER PUBLICATIONS

Krupp et al., "VPN Client User Guide for Windows", Apr. 2003, Release 4.0, Cisco Systems, Inc., P.cover, ix, 1-3, 1-4, 1-5, 1-6, 1-7, 2-1, 2-2, 4-7, 4-8, 5-3, Index.*

(Continued)

*Primary Examiner*—Khanh B Pham
(74) *Attorney, Agent, or Firm*—Alfred A. Fressola; Ware, Fressola, Van Der Sluys & Adolphson LLP

(57) ABSTRACT

The present invention relates to a method and a virtual private network (VPN) gateway server 10 providing rules for wireless access over a secure tunnel connection to a corporate network 20. The corporate network 20 is protected by firewall functionality, with different access configurations for different remote users. The VPN gateway server 10 includes a user database 15 which provides rules specific for each user for the access to the corporate network 20 using the secure tunnel. The rules include specific sets of TCP ports associated with respective specific users. The gateway server 10 limits an authenticated user's access to the corporate network 20, which access is performed by means of the tunnel connection provided by the gateway server 10, to the associated allowed TCP server ports.

17 Claims, 2 Drawing Sheets

FOREIGN PATENT DOCUMENTS

| JP | 2001350718 | 12/2001 |
|---|---|---|
| WO | WO 02/50695 | 6/2002 |
| WO | WO 03/029916 | 4/2003 |
| WO | WO 03029916 A2 * | 4/2003 |
| WO | WO 03/045034 | 5/2003 |

OTHER PUBLICATIONS

Faisal, "International Search Report PCT/IB/03/03606", Feb. 19, 2004, European Patent Office, p. 1-3.*

Guruprasad et al, "Security Features in Ethernet Switches for Access Networks", Oct. 15, 2003, TENCON'2003, IEEE Press, p. 1211-1214, <Retrieved from IEEE Explore Jun. 13, 2009>.*

Ross et al, "A Composable Framework for Secure Multi-Modal Access to Internet Services from Post-PC Devices", Oct. 2002, Mobile Networks and Applications, p. 389-406, <Retrieved from internet Jun. 13, 2009>.*

Kirchel et al, "Internet Primer for Economists: I. Introduction", Nov. 1994, The Economic Journal, Blackwell Publishing for the Royal Economic Society, p. 1496-1523, <Reitreved from www.jstor.org/stable/2235485>.*

Dantas, "Distributed Systems High-Performance Networks Clusters and Computational Grids", 2002, Course Notes, 66 slides, <Retrieved from internet Jun. 13, 2009>.*

Held, "Focus on the Asanté FriendlyNet VR2004 series VPN security router", Nov. 2003, International Journal of Network Management, p. 427-432, <Retrieved from Wiley Jun. 15, 2009 via EIC2100>.*

Stallings, "Patching the Cracks in SNMP", Aug. 1996, Byte Magazine, p. 55-56, <Retrieved from EIC request Jun. 15, 2009>.*

Hayato Ishibashi, et al; "A User-Based Access Control Method for LAN Sockets Providing Protection Against Unauthorized Access"; Industrial Processing Society of Japan Journal, vol. 42, No. 1, pp. 79-88.

* cited by examiner

PERSONAL REMOTE FIREWALL

CROSS-REFERENCE TO RELATED APPLICATIONS

This application claims priority under 35 USC §119 to International Patent Application No. PCT/IB03/03606 filed Aug. 29, 2003.

TECHNICAL FIELD OF THE INVENTION

The present invention relates to a method and a virtual private network (VPN) gateway server providing rules for wireless access over a secure tunnel connection to a corporate network.

BACKGROUND OF THE INVENTION

The desire and possibility to use wireless terminals for accessing the Internet is expected to grow rapidly during the coming years. Such access will be greatly improved by the third generation (3G) mobile networks which the mobile network operators have introduced, or are about to introduce, around the world. Also, existing mobile networks have recently been upgraded with additional functionality to facilitate such access, for example GSM (Global System for Mobile communications) networks upgraded with GPRS (General Packet Radio Service) functionality.

At the same time, the number of employees wishing to use their wireless terminals to access resources of their company when they are outside of the office are continuously growing, especially with the introduction of more and more powerful wireless devices that provide functionality which make them suitable as a remote working tool.

The desire for wireless access to corporate network resources, together with the increasing possibilities for wireless access to the Internet, will increase the companies deployment of Virtual Private Networks (VPN) designed to provide clients with wireless access to company resources.

In general, a Virtual Private Network (VPN) is a concept which builds a secure, private communication infrastructure on top of a public network. The logical concept VPN tunnel replaces a private line and the tunnel may interconnect two corporate network sites, a so-called site-to-site VPN, or interconnect a remote user with a corporate network, a so-called remote access VPN.

In a remote access VPN a VPN gateway server typically interconnects the corporate network with the Internet. Thus, a user may use a dial-up Internet connection, provided by an Internet Service Provider, in order to connect to a corporate network through the VPN gateway server. Since the user connects over a public network, certain security measures need to be taken, typically encryption of the connection and authentication of the user. After the VPN gateway server successfully has authenticated a user over the encrypted connection between the client and the corporate VPN gateway, the user is provided with access to the corporate network over a so called secure VPN tunnel. Using the tunnel, the user is able to access different resources in the company network. Similarly, if the users use wireless client terminals having Internet access via a wireless network, secure VPN tunnels may be established between the wireless clients and a VPN gateway through the wireless network and the Internet, thereby enabling wireless remote access to a corporate network resources.

As stated, access to a corporate network over a secure VPN tunnel connection implies encryption of the connection and authentication of the accessing user. However, once the secure tunnel connection is established there are no user specific accessing rules within the tunnel. Instead, the tunnel enables a wireless client to use all TCP ports that are constantly opened for any authenticated accessing user.

To have constantly opened TCP ports within a secure tunnel connection for all authenticated users is not in line with the fact that many employees using wireless client terminals only need access to certain applications within a corporate network. Moreover, some employees may not even be authorized to access certain corporate applications. Therefore, it is desirable to provide a design which in a simple way enables a company to control to what extent wireless clients are allowed to access a corporate network within a secure VPN tunnel.

SUMMARY OF THE INVENTION

The present invention provides a VPN gateway with firewall functionality which is able to differentiate the type of access allowed by different users to a corporate network.

According to the invention, this functionality is achieved by a method of a virtual private network (VPN) gateway server (10) providing rules for wireless access over a secure tunnel connection to a corporate network (20), the method including: configuring a user database (15, 25) of the server to provide user specific rules for the access over the secure tunnel connection, the configuring including associating different specific users with respective sets of allowed TCP server ports; authenticating a user connecting to the secure tunnel connection; and limiting the authenticated user's access to the corporate network (20) by forwarding only user data received in the secure tunnel that as destination has a port that is included by the set of allowed TCP server ports associated with the user in the user database (15, 25). It is also achieved by a virtual private network (VPN) gateway server (10) providing rules for wireless access over a secure tunnel connection to a corporate network (20), the server (10) including: a user database (15, 25) providing user specific rules for the access over the secure tunnel connection by storing associations between different specific users and respective sets of allowed TCP server ports; authenticating means (11) for authenticating a user connecting to the secure tunnel connection; and port filtering means (12) for limiting the authenticated user's access to the corporate network (20) by forwarding only user data received in the secure tunnel that as destination has a port that is included by the set of allowed TCP server ports associated with the user in the user database (15, 25). Preferred embodiments are defined in the dependent claims.

The idea on which the present invention is based is to provide wireless remote access to a corporate network, which network is protected by firewall functionality, with different access configurations for different remote users.

According to the invention, a VPN gateway server includes a user database which provides rules specific for each user for the access to the corporate network using the secure tunnel. The rules include specific sets of TCP ports associated with respective specific users. The gateway server limits an authenticated user's access to the corporate network, which access is performed by means of a tunnel connection provided by the gateway server, to the associated allowed TCP server ports.

Thus, rather than allowing an authenticated user to use any available TCP server ports within the secure tunnel, the firewall functionality of the VPN gateway server according to the invention will only allow a user to access the corporate network by means of the secure tunnel using the TCP server ports associated with the user in the user database. This means that it is possible to differentiate the types of access to the corporate network that are allowed by different users. For example, one user may be allowed to use all available TCP ports, or sockets, within the secure tunnel, thus giving the option to remotely interact with a various number of applications in the corporate network. At the same time, another user may only be allowed to use TCP server ports for remotely interacting with an electronic mail server process in the corporate network.

The secure tunnel is preferably bound to a specific TCP server port of the gateway server, while the allowed TCP ports for the actual user traffic within the secure tunnel are pre-configured in the user database. The TCP server port for the tunnel itself is pre-configured in the user's application.

Preferably, a user's access to the corporate network involves two separated TCP sessions. One VPN tunnel in the form of an encrypted connection between the user's wireless client terminal and the gateway server, and one session between the gateway server and a back-end server of the corporate network. In the latter TCP session, the gateway server acts as a client against a server socket defined by an allowed TCP server port.

The user database may be configured in various advantageous ways to control and improve a users access to the corporate network over the tunnel connection. Some of these possible configurations are discussed below.

Preferably, the user database associates an allowed TCP server port number of a specific user with a specific IP address within the corporate network. In this way, user data of different clients using the same port protocol, either by using the same well known sockets or using different TCP port numbers associated with the same port protocol, may be forwarded to different IP address destinations within the corporate network. These destinations may then be used to differentiate the accessible services and applications for different users using the same access protocol.

Advantageously, the allowed TCP server ports of a user are client side TCP server ports associated in the user database with respective server side TCP server ports. This provides the possibility to associate different client side TCP server ports with the same server side TCP server port. This is advantageous since it enables a client to execute, for example, two different instances of a client application processes against the same server application process. For example, the client may have two different simultaneous mail client processes communicating with one and the same mail server process.

It is further advantageous to configure the user database to associate different client side TCP ports allowed for a specific user with the same server side TCP port but with different IP addresses. In this way a client is able to have simultaneous connections using the same protocol to different IP addresses in the corporate network using different client side TCP ports for the different connections. This provides the possibility for a client to have different simultaneous mail client processes communicating with different mail server processes on different IP addresses.

Advantageously, the user database is configured to associate a client side TCP server port with a server side TCP server port and IP address of a corporate DNS server within the corporate network. This enables the client in question to use a corporate DNS service within the tunnel connection.

The set of allowed TCP server ports within the tunnel that are associated with a specific user is preferably transmitted to the user after he has been authenticated. In this way the user will be informed of what TCP server ports that are allowed to be used in the tunnel in case the client has not been pre-configured with the information of those allowed TCP server ports. Also, it enables changing allowed TCP ports in the user database without having to re-configure the client accordingly before using the tunnel connection.

The TCP server ports allowed for use by a client may either be ports of well known sockets or arbitrary ports. In case arbitrary TCP server ports are used an embodiment of the invention provides that the user database associates a port specific protocol with the allowed TCP server ports, which protocols are transmitted to the client together with the TCP ports after authentication.

The above mentioned and further features of, and advantages with, the present invention, will be more fully understood from the following description of a number of exemplifying embodiments of the invention. As is understood, various modifications, alterations and different combinations of features coming within the spirit and scope of the invention will become apparent to those skilled in the art when studying the general teaching set forth herein and the following detailed description.

BRIEF DESCRIPTION OF THE DRAWINGS

Exemplifying embodiments of the present invention will now be described with reference to the accompanying drawings, in which.

DETAILED DESCRIPTION OF THE INVENTION

Figure 1:
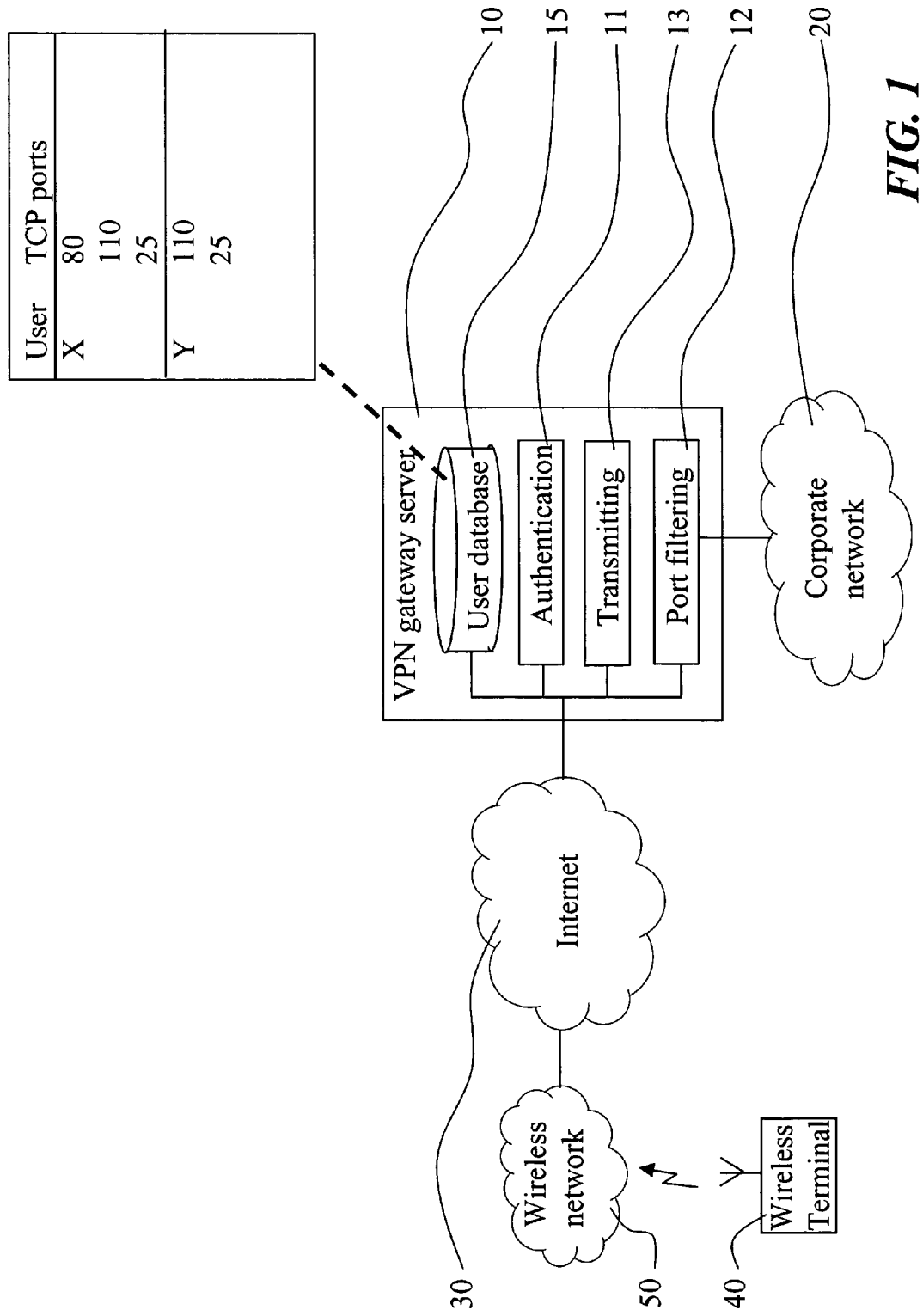
FIG. 1 schematically shows an exemplifying overall system environment in which an embodiment of the invention is included and operable.

With reference to FIG. 1 the invention will now be described in more detail. FIG. 1 shows a virtual private network (VPN) gateway server 10 interconnecting a corporate network 20, typically an Intranet, and the Internet 30. A user's wireless client terminal 40 is shown as having access to the Internet via a wireless network 50.

The VPN gateway server includes a user database 15 configured to associate different users with different user specific rules for accessing the corporate network 20. The user database provides the user specific rules by associating different users with different sets of TCP server ports that are allowed to be used when accessing the corporate network by means of a VPN tunnel connection.

The VPN gateway server 10 is configured to use one specific TCP server port for providing the secure VPN tunnel with which a user may access the corporate network 20 using the wireless client terminal 40. The tunnel is created when the wireless client 40 uses this specific port to initiate an SSL (Secure Socket Layer) encrypted connection between the client 40 and the gateway server 10 as an own session. This session ends at the gateway server. The further connection between the gateway server 10 and back-end servers of the corporate network 20 are provided by means of new, non-encrypted separate TCP sessions.

Thus, a user's access to a back-end server of the corporate network 20 is provided by means of a specific TCP session between the client 40 and the gateway server 10 and an additional TCP session between the gateway server 10 and the back-end server with the gateway server acting as a client.

The VPN gateway server 10 further includes authenticating means 11 for authenticating a user connecting to the VPN tunnel, port filtering means 12 for limiting an authenticated user's access in the tunnel and transmitting means 13 for transmitting a set of allowed TCP server ports to an authenticated user.

The skilled person will appreciate that the user database 15, the authenticating means 11, the port filtering means 12 and the transmitting means 13 all are implemented by well known, state of the art hardware circuits, including memory circuits, interface circuits and a microprocessor, that are configured and controlled so as to operate in accordance with the invention. The microprocessor executes program instructions which have been loaded into a memory and which causes the hardware circuits to be configured and to operate in accordance with the various embodiments of the invention. The design of these program instructions will be appreciated by a person skilled in the art of programming after having studied the content of the present application.

Again referring to FIG. 1, an exemplifying embodiment will now be described. In FIG. 1 an exemplifying configuration in the user database 15 is shown which associates a user X with a set of allowed TCP ports consisting of ports 80, 110 and 25. These ports are known by the skilled person as sockets for the HTTP (HyperText Transport Protocol), POP3 (Post Office Protocol—Version 3) and SMTP (Simple Mail Transfer Protocol) protocols, respectively. Similarly, a user Y is associated with the allowed TCP ports 110 and 25 only. Thus, user Y's access to the corporate network 20 is configured to be restricted to mail server access, while user X in addition to mail server access also is allowed to access web applications within the corporate network.

The wireless client 40 includes a client application configured to access the VPN tunnel provided by the gateway server. To access the tunnel the client connects to the IP address of the VPN gateway server and the specific TCP server port of the tunnel. If the TCP server port for the tunnel for example is port 83, the client application will be pre-configured to connect to TCP server port 83 when accessing the VPN tunnel.

The operation of the embodiment shown in FIG. 1 will now be described. According to the invention the user database 15 is first configured with user specific rules for TCP server port access using the VPN tunnel. As described above, this configuration includes associating different sets of allowed TCP server ports with different users. The resulting configuration of the user database in this embodiment is described above and also indicated in FIG. 1.

When the user wishes to access the corporate network he uses the wireless client 40 and the IP address of the VPN gateway server 10 to connect to the TCP server port of the VPN tunnel, i.e. in this case port 83. By using this port to initiate an SSL-encrypted connection between the client 40 and the gateway server 10 a secure VPN tunnel is created. The VPN gateway server 10 will then authenticate the user based on user identification and password information transmitted by the user from the wireless client 40 over the TCP/IP connection to TCP server port 83 of the tunnel. When the user has been authenticated the VPN gateway server retrieves the allowed TCP server ports associated with the specific user from the user database 15. The VPN server 10 then returns a client session number and the specific allowed TCP server ports to the wireless client application, e.g. ports 80, 110 and 25 if the connecting user is the above described user X. These TCP server ports are now the only ports allowed in the tunnel.

Having received the allowed TCP server ports from the VPN gateway server 10 the wireless client 40 will know what protocols to use in the opened secure tunnel. (Should the allowed TCP ports not be well known sockets, the server 10 will also have transmitted to the client the protocols to use with the allowed TCP ports). The user may now start using applications requiring protocols corresponding to the protocols that are possible to use in connection with the allowed TCP ports. Typically, a client application will open a client side TCP port and transmit a request within the tunnel to be connected to an allowed server side TCP port. For example, user X may use a web browser application which opens a client side port 1077 and requests to be connected to the allowed server side TCP port 80. The client will route this request for connection to the socket in the tunnel, i.e. via the established connection to the server side TCP port 83. All the client requests for connections to different sockets are in this way routed to the same opened server socket connection, i.e. TCP server port 83 of the SSL encrypted secure tunnel.

Upon receiving data from the wireless client in the secure tunnel, the gateway server 10 decrypts the data and checks with the user database if user X is allowed to use TCP server port 80 in the tunnel. Since he is, the gateway server 10 will act as a client and establish a new separate TCP session by connecting to TCP port 80 of that back-end server that hosts the web application server process in the corporate network. The gateway server 10 will then forward the decrypted user data over this separate TCP session.

Assume now that user Y would like to run a corporate web browser application. According to the configuration, the gateway server 10 will prevent user Y from this kind of access to corporate network. When user Y routes a request for connection to port 80 in the tunnel, the gateway server will, after decryption of received data, discover that user Y is not allowed to use the requested TCP server port. Therefore, the gateway server 10 will not establish any TCP session to port 80 of a back-end server and no data will be forwarded to the corporate network. However, if user Y had been trying to access the mail server in the corporate network, such access would have been provided by the gateway server 10 since it would have involved TCP server ports allowed for use by user Y in the tunnel (port 25 and 110). Thus, the gateway server 10 limits user Y's access to the corporate network.

Figure 2:
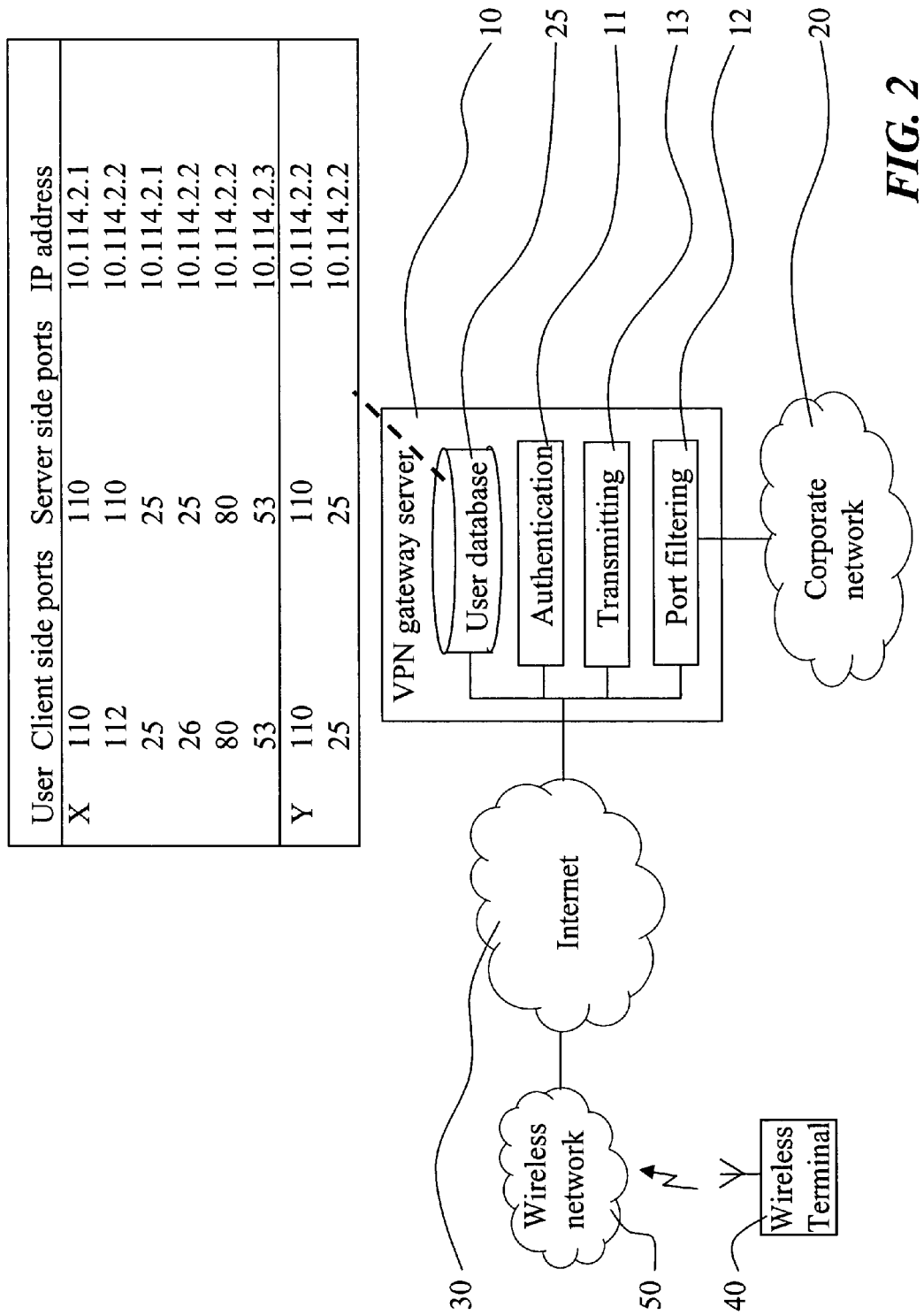
FIG. 2 schematically shows the same exemplifying overall system environment in which another embodiment of the invention is included and operable.

With reference to FIG. 2 another exemplifying embodiment of the invention will now be described. In this embodiment the user database is configured to provide additional user specific rules for the access to the corporate network. The configuration of and access to the VPN tunnel correspond to that already described with reference to FIG. 1. Further, all elements in FIG. 2 having a design and operation corresponding with that of the elements in FIG. 1 have been denoted with the same reference signs as used in FIG. 1.

The allowed TCP server ports associated with a user are in this embodiment allowed client side TCP server ports which in the user database 25 are associated with respective server side TCP server ports. When receiving a request over the VPN tunnel for connection to an allowed client side TCP server port, the gateway server 10 will establish a new TCP session by connecting to the associated server side TCP server port. User data received in the secure tunnel and having an allowed client side TCP server port as destination will then be forwarded to the associated server side TCP server port. In addition, each user's client side TCP server port is associated with an IP address, enabling the same client side TCP server port number of different users to be associated with different IP addresses.

FIG. 2 shows an exemplifying configuration which involves users X and Y. Again it is assumed that the applications on the corporate network uses port numbers in accordance with the common way to use these numbers, i.e. port 25 for the SMTP protocol, port 110 for the POP3 protocol, port 80 for the HTTP protocol and port 53 for Domain Name Server applications. With the configuration in FIG. 2, user X is allowed to use the client side TCP server ports 25, 26, 110 and 112 to access different mail server applications having different IP addresses.

Upon authentication of user X, the VPN gateway server transmits the allowed client side TCP server ports to the wireless terminal 40 operated by user X over the secure tunnel. User X then knows what ports that are allowed to be used. Should a port number not be a well known socket, the gateway server also transmits the port specific protocol to the user, which protocol is to be used together with a specific port. Alternatively, the wireless client is pre-configured with what protocols to use together with various port numbers.

From the configuration of the user database 25 in FIG. 2 it can be seen that user X is allowed to access two different POP3 server processes, residing on the two different IP addresses 10.114.2.1 and 10.114.2.2 on the corporate network, by using the different client side TCP server ports 110 and 112 together with the POP3 protocol in the tunnel. As indicated in FIG. 2, traffic in the secure tunnel from user X using client side TCP server port 110 will be forwarded over a TCP connection to IP address 10.114.2.1 and server side TCP port 110, whereas traffic using client side TCP server port 112 will be forwarded to a TCP connection to IP address 10.114.2.2 and server side TCP port 110.

User Y on the other hand is only allowed to use the client side TCP server ports 25 and 110. Thus, user Y's mail server access to the corporate network is limited to the server side TCP server ports used for POP3 and SMTP by the mail server having IP address 10.114.2.2. Thus, the same client side TCP server port number of the two different users, i.e. port number 110, is here associated with the same server side TCP port number, but with different IP addresses. In this way the gateway server is able to forward user data from different users that use the same communication protocol to server side TCP ports of different IP address destinations.

User X is also allowed to use client side TCP server ports 80 and 53 associated with respective server side TCP ports and IP addresses of a web server application and a domain name server in the corporate network. User Y does not have any client side ports associated with server side ports for web server applications or domain name server applications. Thus, user Y's access to the corporate network is limited to mail server access only.

It should be noted that the detailed description above of different embodiments of the invention has been given by way of illustration only and that these therefore are not intended to limit the scope of the invention, as it is defined by the appended claims. It is especially to be understood that features of the different described embodiments advantageously may be combined to produce new embodiments falling within the scope of the appended claims.

Furthermore, it will be appreciated that other alterations and modifications falling within the scope of the appended claims and within the spirit and scope of the general teaching set forth herein will become apparent to those skilled in the art when studying the claims and the detailed description.

What is claimed is:

1. A method comprising:
    configuring a user database of a virtual private network gateway server that provides rules for wireless access over a secure tunnel connection to a corporate network so as to provide user specific rules for the access over the secure tunnel connection, the configuring including associating different specific users with respective sets of allowed transmission control protocol server ports, wherein the allowed transmission control protocol server ports associated with a specific user are allowed client side transmission control protocol server ports, and the configuring further includes configuring the user database to associate an allowed client side transmission control protocol server port with a server side transmission control protocol server port;
    authenticating a user connecting to the secure tunnel connection; and
    limiting the authenticated user's access to the corporate network by forwarding only user data received in the secure tunnel that as a destination has a port that is included in the set of allowed transmission control protocol server ports associated with the user in the user database such that user data received in the secure tunnel is forwarded to a server side transmission control protocol server port associated with an allowed client side transmission control protocol server port over a separate transmission control protocol connection, in which connection of the gateway server acts as a client, and further such that when receiving at the gateway server at least one application request over said secure tunnel for connection to an allowed client side transmission control protocol server port, said gateway server acts as a client to establish a new separate transmission control protocol connection for each of said application requests.

2. The method as claimed in claim 1, including configuring the secure tunnel to be bound to a specific transmission control protocol server port of the gateway server.

3. The method as claimed in claim 1, wherein said configuring includes configuring the user database to associate different allowed client side transmission control protocol server ports, which are associated with a specific user, with the same server side transmission control protocol port but with different respective internet protocol addresses, the method including forwarding user data received in the secure tunnel to the internet protocol address associated with an allowed client side transmission control protocol server port.

4. The method as claimed in claim 3, wherein the configuring includes configuring the database to associate different allowed client side transmission control protocol server ports with server side transmission control protocol server ports of different electronic mail servers having respective internet protocol addresses.

5. The method as claimed in claim 1, wherein the configuring includes configuring the database to associate an allowed client side transmission control protocol server port with a server side transmission control protocol server port and internet protocol address of a corporate domain name system server within the corporate network.

6. The method as claimed in claim 1, including the transmitting to the authenticated user, over the secure tunnel, the set of allowed transmission control protocol server ports that are associated with the authenticated user in the user database.

7. The method as claimed in claim 6, wherein the configuring includes configuring the user database to associate a port specific protocol with an allowed transmission control protocol server port, which port specific protocol is transmitted together with the allowed transmission control protocol server port to the authenticated user.

8. A virtual private network gateway server providing rules for wireless access over a secure tunnel connection to a corporate network, the server comprising:
    an addressable memory for storage of a user database, the user database providing user specific rules for the access over the secure tunnel connection by storing associations between different specific users and respective sets of allowed transmission control protocol server ports, wherein the allowed transmission control protocol server ports associated with a specific user are allowed client side transmission control protocol server ports, and the user database further associates an allowed client side transmission control protocol server port with a server side transmission control protocol server port;

an authenticating unit for authenticating a user connecting to the secure tunnel connection; and a port filter for limiting the authenticated user's access to the corporate network by forwarding only user data received in the secure tunnel that as a destination has a port that is included by the set of allowed transmission control protocol server ports associated with the user in the user database such that user data received in the secure tunnel is forwarded to a server side transmission control protocol server port associated with an allowed client side transmission control protocol server port over a separate transmission control protocol connection, in which connection the gateway server acts as a client, and further wherein when receiving at the gateway server at least one application request over said secure tunnel for connection to an allowed client side transmission control protocol server port, said gateway server acts as a client to establish a new separate transmission control protocol connection for each of said application requests.

9. The gateway server as claimed in claim 8, wherein the secure tunnel is bound to a specific transmission control protocol server port of the gateway server.

10. The gateway server as claimed in claim 8, wherein the user database associates different allowed client side transmission control protocol server ports, which are associated with a specific user, with the same server side transmission control protocol port but with different respective internet protocol addresses, wherein the port filter is arranged for forwarding user data received in the secure tunnel to the IP address associated with an allowed client side transmission control protocol server port.

11. The gateway server as claimed in claim 10, wherein the user database associates different allowed client side transmission control protocol server ports with server side transmission control protocol server ports of different electronic mail servers having respective internet protocol addresses.

12. The gateway server as claimed in claim 8, wherein the user database associates an allowed client side transmission control protocol server port with a server side transmission control protocol server port and internet protocol address of a corporate domain name system server within the corporate network.

13. The gateway server as claimed in claim 8, including a transmitter for transmitting to the authenticated user, over the secure tunnel, the set of allowed transmission control protocol server ports that are associated with the authenticated user in the user database.

14. The gateway server as claimed in claim 13, wherein the user database associates a port specific protocol with an allowed transmission control protocol server port, said transmitter being arranged for transmitting the port specific protocol together with the allowed transmission control protocol server port to the authenticated user.

15. A virtual private network system including:
a corporate network;
a virtual private network gateway server in accordance with claim 8 for providing wireless access over a secure tunnel connection to the corporate network; and
at least one wireless client terminal,
wherein the client terminal is configured to use a specific transmission control protocol server port and internet protocol address when connecting to the virtual private network gateway server over the tunnel connection and a specific set of transmission control protocol server ports within the tunnel connection when accessing the corporate network.

16. The system as claimed in claim 15, wherein the wireless client terminal is configured to receive the transmission control protocol server ports, to be used within the tunnel connection, from the gateway server in response to an authentication message transmitted to the gateway server.

17. A virtual private network gateway server providing rules for wireless access over a secure tunnel connection to a corporate network, the server comprising:
means for storing a user database, the user database providing user specific rules for the access over the secure tunnel connection by storing associations between different specific users and respective sets of allowed transmission control protocol server ports, wherein the allowed transmission control protocol server ports associated with a specific user are allowed client side transmission control protocol server ports, and the user database further associates an allowed client side transmission control protocol server port with a server side transmission control protocol server port;
means for authenticating a user connecting to the secure tunnel connection; and
means for limiting the authenticated user's access to the corporate network by forwarding only user data received in the secure tunnel that as a destination has a port that is included by the set of allowed transmission control protocol server ports associated with the user in the user database such that user data received in the secure tunnel is forwarded to a server side transmission control protocol server port associated with an allowed client side transmission control protocol server port over a separate transmission control protocol connection, in which connection the gateway server acts as a client, and further wherein when receiving at the gateway server at least one application request over said secure tunnel for connection to an allowed client side transmission control protocol server port, said gateway server acts as a client to establish a new separate transmission control protocol connection for each of said application requests.

* * * * *